(12) United States Patent
Morgenstern

(10) Patent No.: US 6,589,646 B1
(45) Date of Patent: Jul. 8, 2003

(54) COMPOSITE LAYERED SHEET OF FILM FOR REFRIGERATORS

(75) Inventor: Herbert Morgenstern, Ellerstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/565,065

(22) Filed: May 5, 2000

(30) Foreign Application Priority Data

May 6, 1999 (DE) .......................................... 199 20 916

(51) Int. Cl.$^7$ ................................................. B32B 3/26
(52) U.S. Cl. ................. 428/318.6; 428/213; 428/316.6; 428/318.4; 428/319.3; 428/319.7
(58) Field of Search .............................. 428/213, 316.6, 428/318.4, 318.6, 319.3, 319.7

(56) References Cited

U.S. PATENT DOCUMENTS

| 4,069,934 | A |   | 1/1978  | Karabedian ................... 215/12     |
| 4,476,183 | A |   | 10/1984 | Holtrop et al. ............. 428/286       |
| 5,227,245 | A | * | 7/1993  | Brands et al. ............... 428/483      |
| 5,310,584 | A |   | 5/1994  | Jacoby et al. .................. 428/2     |
| 5,338,601 | A | * | 8/1994  | Brands et al. ............ 428/319.7       |
| 5,340,208 | A | * | 8/1994  | Hauck et al. ................ 312/406      |
| 5,418,055 | A | * | 5/1995  | Chen et al. ............... 428/317.7      |
| 5,834,126 | A | * | 11/1998 | Sheu ........................... 428/515   |
| 6,074,678 | A | * | 6/2000  | Blackwelder et al. ........ 156/182        |
| 6,164,739 | A | * | 12/2000 | Schulz et al. ................ 312/406     |

FOREIGN PATENT DOCUMENTS

| DE | 28 21 333 C2 | 11/1978 |
| EP | 0 084 360 B1 | 7/1983  |
| EP | 533 388      | 3/1993  |
| GB | 1 595 128    | 8/1981  |
| JP | 5096673      | 4/1993  |
| NL | 7216119      | 6/1973  |

* cited by examiner

Primary Examiner—Terrel Morris
Assistant Examiner—Leanna Roché
(74) Attorney, Agent, or Firm—Keil & Weinkauf

(57) ABSTRACT

A composite layered sheet or composite layered film made from thermoplastics or thermoplastic mixtures comprises at least one substrate layer A) and at least one functional layer B) which comprises one or more blowing agents or nucleating agents, where the functional layer B) is thinner than the substrate layer A). A process for producing the sheet or film and a process for producing thermally insulating moldings are described.

12 Claims, No Drawings

COMPOSITE LAYERED SHEET OF FILM FOR REFRIGERATORS

The invention relates to a composite layered sheet or composite layered film made from thermoplastics or thermoplastic mixtures, comprising at least one substrate layer A) and at least one functional layer B) which comprises one or more blowing agents or nucleating agents, and to a process for producing the sheet or film, and also to a process for producing thermally insulating moldings.

Polystyrene sheets and polystyrene films applied to polyurethane foams frequently exhibit the problem known as blistering. Defects in the polyurethane foam give rise to accumulation and condensation of the blowing agents, which dissolve in the polystyrene layer. When the temperature changes, the dissolved blowing gas escapes from the polystyrene, forming blisters.

In refrigerator components, for example, the polystyrene wall is protected by introducing, between this and the polyurethane foam, a barrier film made from polyolefins (EP-A 0492886).

Composite layered sheets or composite layered films made from an unfoamed thermoplastic and a foamed plastic are known. However, the foam here is the principle component, and the unfoamed thermoplastic forms a protective layer.

NL-7216119, for example, describes moldings made from a closed-cell foam core and a smooth and glossy skin. The moldings are produced by extruding a thermoplastic which comprises a filler and a blowing agent. The surface of the extrusion die here is held at a temperature below the decomposition temperature of the blowing agent.

DT 2821333 describes a tube made from a thermoplastic material and composed of a central foam layer between two outer layers. The tube is produced by coextrusion, and the material for the central layer comprises a blowing agent. This gives a tube which is light in weight but nevertheless stable.

EP-A 0084360 describes a shrink sheath made from a foamed and an unfoamed polystyrene layer. In order to achieve sufficient impact absorption the thickness of the foamed layer is from 0.1 to 1 mm. The thickness of the unfoamed layer is from 2 to 160 mm. It serves for printability. The shrink films are used as a protective layer for glass bottles.

U.S. Pat. No. 4,069,934 describes another shrink film made from an inner closed-cell foam layer made from polystyrene and ethylene-vinyl acetate copolymer and from an unfoamed outer layer made from polyethylene.

It is an object of the present invention to provide a composite layered sheet or composite layered film which is suitable in particular for producing refrigerator housings with polyurethane foam cores. Using the composite layered sheet it should be possible to produce refrigerator parts in a simple and advantageous manner, without the appearance of visible blisters.

A further object is to provide a composite layered sheet having improved adhesion to foam materials, especially polyurethane foam.

We have found that this object is achieved by means of a composite layered sheet or composite layered film made from thermoplastics or thermoplastic mixtures, comprising at least one substrate layer A) and at least one functional layer B) which comprises one or more blowing agents or nucleating agents, where the functional layer B) is thinner than the substrate layer A).

Examples of suitable thermoplastics for the substrate layer A) and for the functional layer B) are glass-clear polystyrene (GPPS), impact-modified polystyrene (HIPS), styrene copolymers, such as styrene-butadiene block copolymers, ASA, SAN, ABS, polyolefins, such as polyethylene or polypropylene, acrylates and methacrylates, such as PMMA, polycarbonates (PCs), polyvinyl chloride (PVC), polyethylene terephthalate (PET) and mixtures of these.

The substrate layer A) and the functional layer B) preferably comprise polystyrene. It is particularly preferable for the substrate layer A) to use an environmental-stress-cracking-resistant, impact-modified polystyrene. The functional layer B) is preferably composed of the same thermoplastics as the substrate layer A), or of a polystyrene/polyethylene blend. Other layers, in particular layers with a relatively high gloss, degree of coloration, environmental stress-cracking resistance, or resistance to chemicals or environmental effects, or with a different surface structure, may be applied to the substrate layer A). Particular preference is given to a gloss outer layer C) made from polystyrene.

The thickness of the functional layer B is not more than 40%, preferably from 1 to 40%, in particular from 2 to 10%, of the total thickness of the composite layered sheet. The thickness of the substrate layer is generally from 0.1 to 50 mm, preferably from 1 to 5 mm, and the thickness of the functional layer is generally from 0.04 to 2 mm, in particular from 0.1 to 2 mm. The thickness of the gloss outer layer C) is generally from 0.01 to 1 mm, in particular from 0.02 to 0.2 mm The blowing agent or nucleating agents used for functional layer B) maybe the chemical or physical blowing agent or nucleating agents conventionally used for foaming thermoplastics. It is also possible to use one or more blowing agents or nucleating agents or mixtures of blowing agents and nucleating agents.

Examples of blowing agents are aliphatic hydrocarbons, such as propane, butane, isobutane, pentane, neopentane, isopentane and hexane, alicyclic hydrocarbons, such as cyclobutane, cyclopentane and cylohexane, and halogenated hydrocarbons, such as methyl chloride, methylene chloride, dichlorofluoromethane, trichlorofluoromethane and dichlorodifluoromethane. Other blowing agents are sodium bicarbonate, ammonium carbonate and ammonium hydrogencarbonate, citric acid or citrates, such as sodium citrate, sodium glutaminate, phthalic anhydride, benzoic acid, benzoates, such as aluminum benzoate, azodicarbonamide, azoisobutyronitrile and dinitropentamethylene.

Examples of suitable nucleating agents are finely divided inorganic fillers, such as barium sulfate, barium carbonate, calcium sulfate, calcium carbonate, lead sulfate, silicon dioxide, silicates, such as calcium silicate, talc, aluminum dioxide, aluminum silicates, sulfides, titanium dioxide, magnesium oxide, magnesium carbonate, clay, carbon, metal powder, zinc oxide, asbestos and glass fibers. The particle sizes of the nucleating agents are generally from 0.005 to 10 $\mu$m, preferably from 0.01 to 1 $\mu$m.

The amount used of the blowing agent or nucleating agent is generally from 0.1 to 10% by weight, preferably from 0.3 to 3% by weight, based on the functional layer B.

The composite layered sheets or composite layered films may, for example, be produced by coextruding the thermoplastics or the thermoplastic mixtures for the individual layers and/or by laminating the layers onto the substrate layer A). The gloss outer layer C) may, for example, be coextruded for surface-finishing, or laminated onto the substrate layer A) as a weathering-protection film (if desired with a decorative print).

The nucleating agents or blowing agents here may be added during the coextrusion or prepared and added as separate masterbatches in the form of pellets of thermoplastic.

If chemical blowing agents are used some or all of the foaming may take place straightaway during the coextrusion. If nucleating agents are used in the functional layer B), no bubbles form as a rule until changes in temperature take place and there is contact with polyurethane foams comprising blowing agent.

If the composite layered sheet or composite layered film is bonded with a polyurethane foam, using the side which has the functional layer B), there is a reduction in the concentration of the blowing agent escaping from the polyurethane foam as a result of a relatively high level of distribution in the functional layer B). Temperature variations therefore produce many small bubbles in the composite layered sheet instead of one large bubble. Bubble formation takes place preferentially in the functional layer B), and the substrate layer therefore remains essentially intact. The functional layer B) therefore acts as a "sacrificial layer".

In another embodiment, the functional layer may also be prefoamed and subsequently laminated onto the substrate layer.

As a result of the large surface area of the foam cells which form in the functional layer B), the adhesion to a polyurethane foam is also improved. Preferably, in the context of improved adhesion, the functional layer B) should form an open-celled foam structure. In this case the penetration of the PU foam, and mechanical interhooking, become possible. The open-celled character can be controlled through the choice of the metered addition of blowing agent and the choice of temperature.

The novel composite layered sheet or composite layered film is therefore particularly suitable for producing thermally insulating moldings, such as shipping crates, heat accumulators, refrigeration or freezer equipment or components, in particular refrigerator doors.

EXAMPLES

Example 1
Production of a Composite Film: (PS/PS Foam)

Stress corrosion-resistant, high-impact polystyrene (PS 2710 from BASF Aktiengesellschaft) was extruded at a temperature of 200° C. to a layer thickness of 800 μm and was laminated on a triple-roll calender unit with a 500 μm thick polystyrene film (likewise PS 2710) prefoamed using a mixture of sodium bicarbonate and citric acid.

Example 2
Production of a Composite Sheet PU/PS Foam/PS

The composite film from Example 1, cut to size, was inserted with the foamed side upward in the base of a foaming mold (Bosch lance) and a two-component PU molding compound was foamed over it.

Example 3
Production of a Composite Sheet PU/PS/PS Foam

The composite film from Example 1, cut to size, was inserted with the foamed side downward in the base of a foaming mold (Bosch lance) and a two-component PU molding compound was foamed over it.

A micrograph of the cross section showed that the PU foam in the composite sheet from Example 2 had penetrated into the adjacent PS foam layer.

In the peel test, the forces for separating the composite sheets from Examples 2 and 3 were measured, and are summarized in Table 1:

TABLE 1

Peel testing of the composite sheets

| | Composite sheet | Force F [N] |
|---|---|---|
| Example 2 | PU/PS foam/PS | 20.4 |
| Example 3 | PU/PS/PS foam | 5.8 |

I claim:
1. A composite layered sheet or composite layered film consisting essentially of glass-clear polystyrene, impact-modified polystyrene, styrene copolymers or mixtures thereof, comprising a functional layer B) on a substrate layer A), wherein the functional layer B) comprises one or more blowing agents or nucleating agents and is thinner than the substrate, layer A) wherein the substrate layer A) has a thickness of from 0.1 to 50 mm and the functional layer B) has a thickness of from 0.04 to 2 mm.

2. A composite layered sheet or composite layered film as claimed in claim 1, wherein the substrate layer A) is composed of an environmental-stress-cracking-resistant, impact-modified polystyrene.

3. A composite layered sheet or composite layered film as claimed in claim 1, wherein the composite layered sheet or film has a total thickness and the functional layer B) has a thickness not more than 40% of the total thickness of the composite layered sheet or film.

4. A composite layered sheet or composite layered film as claimed in claim 1, wherein the functional layer B) comprises sodium bicarbonate, citric acid, pentane, cyclopentane, silicon dioxide, titanium dioxide, barium sulfate, barium carbonate, magnesium oxide, magnesium carbonate, zinc oxide, talc, chalk, azodicarbonamide or mixtures of these.

5. A composite layered sheet or composite layered film as claimed in claim 1, wherein the functional layer B) comprises an amount of from 0.3 to 3% by weight of the blowing agent or nucleating agent, based on the functional layer B).

6. A composite layered sheet or composite layered film, which is the product of the process of applying a gloss outer layer C) to the substrate layer A) of the composite layered sheet or composite layered film as claimed in claim 1.

7. A thermally insulating molding, which is the product of the process of molding the composite layered sheet or composite layered film as claimed in claim 1.

8. A thermally insulating molding, which is the product of the process of applying a polyurethane foam to the functional layer B) of the composite layered sheet or composite layered film of claim 1.

9. A composite layered sheet or composite layered film made from thermoplastics or thermoplastic mixtures, consisting essentially of at least one substrate layer A) and at least one functional layer B) which comprises one or more blowing agents or nucleating agents, wherein the functional layer B) is thinner than the substrate layer A) and the substrate layer A) and the functional layer B) comprise polystyrene, and wherein said functional layer B) forms an open-celled foam structure and the substrate layer A) has a thickness of from 0.1 to 50 mm and the functional layer B) has a thickness of from 0.04 to 2 mm.

10. A composite layered sheet or composite layered film as claimed in claim 9, wherein said at least one functional layer B) comprises one or more blowing agents and nucleating agents.

11. A thermally insulated molding which is the product of the process of molding a composite layered sheet or composite layered film as recited in claim 9.

12. A thermally insulated molding which is the product of applying a polyurethane foam to the functional layer B) of the composite layered sheet or composite layered film as claimed in claim 9.

* * * * *